United States Patent
Han et al.

(10) Patent No.: US 12,418,052 B2
(45) Date of Patent: Sep. 16, 2025

(54) SEPARATOR INCLUDING GAS GENERATING AGENT AND METHOD OF MANUFACTURING THE SAME

(71) Applicant: LG ENERGY SOLUTION, LTD., Seoul (KR)

(72) Inventors: Da Kyung Han, Daejeon (KR); So Mi Jeong, Daejeon (KR); Min Ji Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 557 days.

(21) Appl. No.: 17/640,933

(22) PCT Filed: Oct. 21, 2020

(86) PCT No.: PCT/KR2020/014430
§ 371 (c)(1),
(2) Date: Mar. 7, 2022

(87) PCT Pub. No.: WO2021/085927
PCT Pub. Date: May 6, 2021

(65) Prior Publication Data
US 2022/0336867 A1  Oct. 20, 2022

(30) Foreign Application Priority Data
Oct. 29, 2019 (KR) .................. 10-2019-0135854

(51) Int. Cl.
*H01M 10/42* (2006.01)
*H01M 50/383* (2021.01)
(Continued)

(52) U.S. Cl.
CPC ...... *H01M 10/4235* (2013.01); *H01M 50/403* (2021.01); *H01M 50/411* (2021.01); *H01M 50/489* (2021.01)

(58) Field of Classification Search
CPC .......... H01M 10/4235; H01M 50/403; H01M 50/411; H01M 50/489; H01M 50/383;
(Continued)

(56) References Cited

U.S. PATENT DOCUMENTS

2003/0072996 A1   4/2003  Roh
2008/0026283 A1*  1/2008  Lee et al. ............ H01M 50/578
                                                             429/61
(Continued)

FOREIGN PATENT DOCUMENTS

CN    102668172 A    9/2012
CN    105436054 A    3/2016
(Continued)

OTHER PUBLICATIONS

Fang et al. Construction and Building Materials 134 (2017) 358-363 (Year: 2017).*
(Continued)

*Primary Examiner* — Lisa S Park
(74) *Attorney, Agent, or Firm* — Birch, Stewart, Kolasch & Birch, LLP

(57) ABSTRACT

A separator including a gas generating agent and a method of manufacturing the same. More particularly, the separator has a porous coating layer including an inorganic material on at least one surface of a porous substrate, wherein the porous coating layer includes a gas generating agent.

17 Claims, 1 Drawing Sheet

(51) Int. Cl.
  *H01M 50/403* (2021.01)
  *H01M 50/411* (2021.01)
  *H01M 50/446* (2021.01)
  *H01M 50/449* (2021.01)
  *H01M 50/489* (2021.01)
  *H01M 50/491* (2021.01)

(58) Field of Classification Search
  CPC ............. H01M 50/449; H01M 50/446; H01M 50/491; Y02E 60/10
  See application file for complete search history.

(56) References Cited

U.S. PATENT DOCUMENTS

| | | | |
|---|---|---|---|
| 2010/0112437 | A1 | 5/2010 | Yoshikawa et al. |
| 2010/0159314 | A1 | 6/2010 | Kim et al. |
| 2010/0167124 | A1 | 7/2010 | Seo et al. |
| 2010/0273032 | A1* | 10/2010 | Kimishima ......... H01M 50/417 521/64 |
| 2012/0015254 | A1 | 1/2012 | Lee et al. |
| 2012/0028089 | A1* | 2/2012 | Mustakallio .......... H01M 50/24 29/623.2 |
| 2013/0054061 | A1 | 2/2013 | Nishimoto |
| 2013/0260207 | A1 | 10/2013 | Uemura |
| 2013/0309530 | A1 | 11/2013 | Shim et al. |
| 2014/0093759 | A1* | 4/2014 | Iwayasu ............ H01M 10/0567 429/61 |
| 2019/0131604 | A1 | 5/2019 | Yoon et al. |

FOREIGN PATENT DOCUMENTS

| | | | |
|---|---|---|---|
| CN | 107425169 A | | 12/2017 |
| CN | 109314207 A | | 2/2019 |
| EP | 0 834 941 A1 | | 4/1998 |
| JP | 2003031208 | * | 1/2003 |
| JP | 2003-162991 A | | 6/2003 |
| JP | 2015-153631 A | | 8/2015 |
| JP | 2016-213210 A | | 12/2016 |
| JP | 6185403 B2 | | 8/2017 |
| KR | 10-1998-024955 A | | 7/1998 |
| KR | 10-2002-0072770 A | | 9/2002 |
| KR | 10-0611556 B1 | | 8/2006 |
| KR | 10-2007-0041975 A | | 4/2007 |
| KR | 20070041975 | * | 4/2007 |
| KR | 10-2007-0082578 A | | 8/2007 |
| KR | 10-0873563 B1 | | 12/2008 |
| KR | 10-2013-0042920 A | | 4/2013 |
| KR | 10-2014-0044527 A | | 4/2014 |
| KR | 20140044527 | * | 4/2014 |
| KR | 10-2014-0054768 A | | 5/2014 |
| KR | 10-1418643 B1 | | 7/2014 |
| KR | 10-2016-0025079 A | | 3/2016 |
| KR | 10-2016-0130718 A | | 11/2016 |
| KR | 10-2017-0069515 A | | 6/2017 |
| KR | 10-1845117 B1 | | 4/2018 |
| KR | 10-2018-0093288 A | | 8/2018 |

OTHER PUBLICATIONS

Extended European Search Report for European Application No. 20881322.0, dated Nov. 18, 2022.
International Search Report for PCT/KR2020/014430 mailed on Feb. 2, 2021.

* cited by examiner

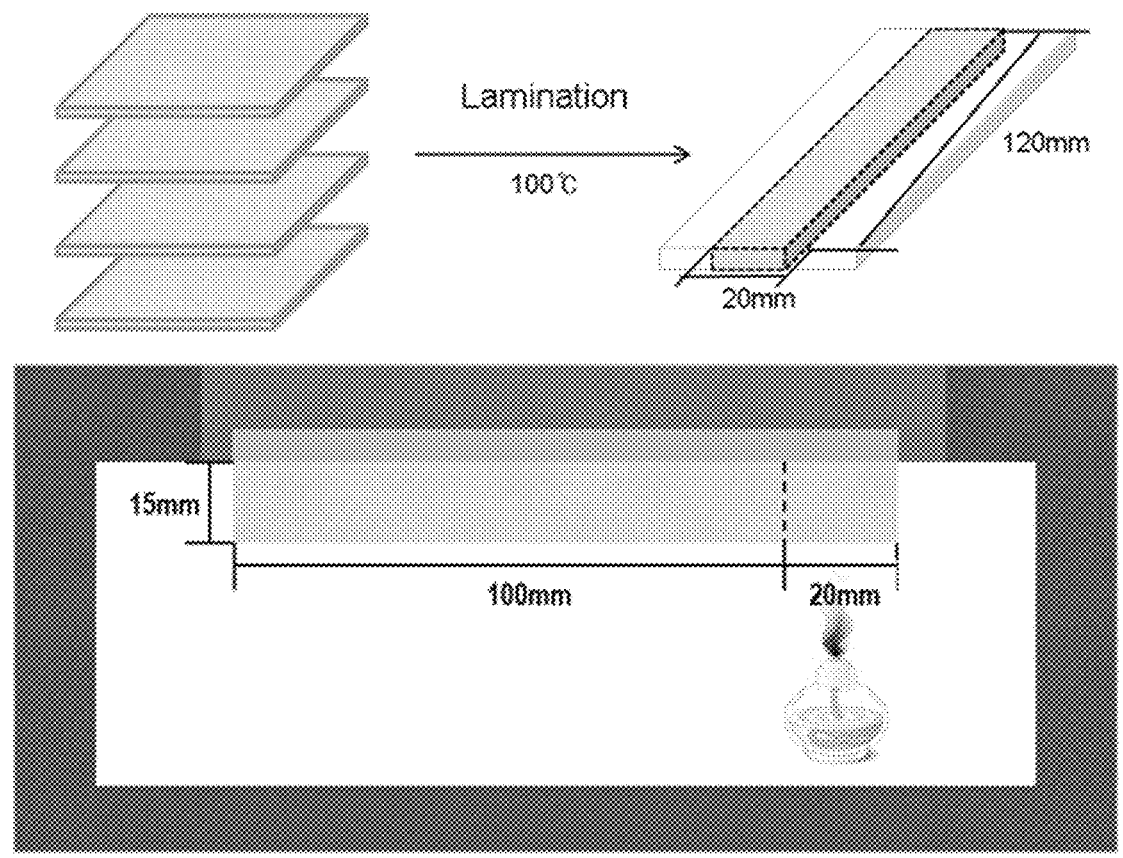

SEPARATOR INCLUDING GAS
GENERATING AGENT AND METHOD OF
MANUFACTURING THE SAME

TECHNICAL FIELD

This application claims the benefit of priority to Korean Patent Application No. 2019-0135854 filed on Oct. 29, 2019, the disclosure of which is hereby incorporated by reference herein in its entirety.

The present invention relates to a separator including a gas generating agent and a method of manufacturing the same. More particularly, the present invention relates to a separator having a porous coating layer including an inorganic material formed on at least one surface of a porous substrate, wherein the porous coating layer includes a gas generating agent.

BACKGROUND ART

A lithium secondary battery is configured such that an electrode assembly having a positive electrode/separator/negative electrode structure, which can be charged and discharged, is mounted in a battery case. Each of the positive electrode and the negative electrode is manufactured by applying a slurry including an electrode active material to one surface or both surfaces of a metal current collector, drying the slurry, and rolling the metal current collector having the dried slurry applied thereto.

A separator is one of the most important factors related to the safety of the battery. It is necessary for the separator to electrically isolate the positive electrode and the negative electrode from each other and to exhibit high ion permeability and high mechanical strength such that an electrolytic solution can pass smoothly through the separator. In addition, the separator must have high temperature safety. Since various electronic devices such as mobile phones and wireless vacuum cleaners are used in various environments, specific technologies are required to ensure high temperature safety in not only large-capacity batteries but also small-capacity batteries.

Conventionally, a small amount of a bromine-based flame retardant was used in a separator to secure high flame retardancy. However, the use of bromine-based flame retardant has been inhibited since the bromine-based flame retardant is a halogen flame retardant that generate toxic substances. Efforts have been made to use an inorganic flame retardant as an alternative to a bromine-based flame retardant.

For example, an inorganic hydroxide-based flame retardant does not contain halogen and is non-toxic. In addition, as the inorganic hydroxide-based flame retardant is less corrosive in processing machines, has excellent electrical insulation, and is inexpensive, it is used in various fields such as home appliances, automobiles, building materials, electric wires, cables, etc. In addition, the inorganic hydroxide-based flame retardants can be used in various ways because it has high heat absorption, inhibits combustion so as to lower the temperature of a polymer, and is stable within the temperature range for molding and processing of the polymer with a high decomposition temperature.

The existing inorganic flame retardant may be used as inorganic particles forming a coating layer on at least one surface of the porous substrate of the separator. As the inorganic flame retardant, alumina ($Al_2O_3$)-based may be used alone or incorporated with an inorganic flame retardant material.

There is concern that a hydrate or hydroxide-based inorganic flame retardant may cause an additional reaction with lithium or the like in the battery due to water produced by pyrolysis. On the other hand, a metal oxide has a problem that dispersion force is weak even when a cyano-based resin is added and used together. In addition, a fatty acid-based dispersant is used to secure dispersion force of the metal hydroxide when preparing a slurry for forming an inorganic coating layer. However, when the fatty acid-based dispersant is used, there is a problem in that the thermal shrinkage of an inorganic coating layer separator is increased or the electrode adhesion is decreased.

In Patent Document 1, a separator and a separator coating layer including a capsule-type foaming agent are formed so as to discharge a flame retardant material as the capsule-type foaming agent expands according to temperature at a high temperature. However, since the flame retardant can be used only in a small amount in the range of 5 wt % to 10 wt % based on the total weight of the coating layer composition, there is a disadvantage in that Patent Document 1 has a limit to imparting flame retardant properties.

Patent Document 2 manufactures a separator for a secondary battery by coating a coating solution containing a flame retardant on a porous film including a polyolefin resin. However, Patent Document 2 does not overcome the disadvantages of the flame retardant itself by using the existing flame retardant.

There is a need to improve the flame retardant technology that does not generate additional reactants, is environmentally friendly while improving the safety of the battery, is safe for a living body, and does not reduce the capacity of the battery, but a clear solution has not yet been proposed.

PRIOR ART DOCUMENTS

Patent Documents (Patent Document 1) Korean Patent Application Publication No. 2017-0069515 (2017 Jun. 21)
(Patent Document 2) Korean Patent Application Publication No. 2002-0072770 (2002 Sep. 18)

DISCLOSURE

Technical Problem

The present invention has been made in view of the above problems, and in particular, in a separator comprising a porous substrate and an inorganic coating layer formed on at least one surface of the porous substrate, it is an object of the present invention to provide a separator that does not generate additional reactants, is environmentally friendly while improving the safety of the battery, is safe for a living body, and does not reduce the capacity of the battery, and a method of manufacturing the same.

Technical Solution

In order to accomplish the above object, a separator according to the present invention may be provided with a porous coating layer including a gas generating agent on at least one surface of a porous substrate.

In addition, the gas generating agent may generate gas by reaction.

When the gas generating agent generates the gas, pores may not be formed in the porous coating layer.

The gas may be an incombustible gas.

The gas generating agent may be an organic foaming agent and/or an inorganic foaming agent.

The organic foaming agent may be selected from the group consisting of azo-containing compounds, organic peroxides, hydrazide-containing compounds, carbazide-containing compounds, and peroxide-containing compounds. The inorganic foaming agent may be selected from the group consisting of carbonate-containing compounds.

The inorganic foaming agent is a material that exhibits an endothermic reaction during pyrolysis and generates $CO_2$. In a concrete example, the inorganic foaming agent is used in the composition of the present invention, and the inorganic foaming agent may be graphite, calcium carbonate ($CaCO_3$), sodium hydrogen carbonate ($NaHCO_3$), sodium silicate, or the like.

In addition, the present invention provides an electric device including the separator.

The present invention provides a method of manufacturing a separator, the method comprising: a) providing a porous substrate; b) forming a coating layer on at least one surface of the porous substrate by applying a slurry obtained by mixing a coating composition comprising a gas generating agent and a binder with a first solvent to obtain a coated separator; and c) drying the coated separator of step b) to obtain a dried separator.

A step of immersing the coated separator of step b) in a second solvent may be added between step b) and step c). A step of immersing the dried separator of step c) in a second solvent.

In the method of manufacturing a separator, the gas generating agent may include an organic foaming agent and/or an inorganic foaming agent.

The organic foaming agent may be selected from the group consisting of azo-containing compounds, organic peroxides, hydrazide-containing compounds, carbazide-containing compounds, and peroxide-containing compounds. The inorganic foaming agent may be selected from the group consisting of bases carbonate-containing compounds.

The inorganic foaming agent may be selected from the group consisting of carbonate-containing compounds.

In the present invention, one or more constructions that do not conflict with each other may be selected and combined from among the above constructions.

DESCRIPTION OF DRAWINGS

The Figure is a schematic view showing a flame retardancy evaluation experiment method for comparison between Examples of the present invention and Comparative Example.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In the case in which one part is said to be connected to another part in the entire specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, the present invention will be described in more detail.

The present invention relates to a separator comprising a porous substrate, and a porous coating layer including a gas generating agent formed on at least one surface of the porous substrate.

An inorganic material may be further added to the porous coating layer.

Porous Substrate

The porous substrate electrically isolates a negative electrode from a positive electrode to prevent a short circuit and can provide a movement path of lithium ions, and a porous membrane having a high resistance to an electrolyte solution, which is an organic solvent, and having a fine pore diameter may be used. The porous substrate is not particularly restricted as long as the porous substrate can be commonly used for a separator material of a secondary battery. For example, the porous substrate may include resins such as polyolefin-based (polyethylene, polypropylene, polybutene, polyvinyl chloride) and a mixture or a copolymer thereof, or resins such as polyethylene terephthalate, polycycloolefin, polyethersulfone, polyamide, polyimide, polyimideamide, polyaramid, polycycloolefin, nylon, and polytetrafluoroethylene. Thereamong, the polyolefin-based resin is preferable because it has excellent applicability of a slurry for a porous coating layer, and it reduces the thickness of a separator for a secondary battery such that the capacity per volume can be increased by increasing the ratio of an electrode active material layer in a battery.

The thickness of the porous substrate may be 1 μm to 100 μm, preferably 1 μm to 30 μm.

Inorganic Material

The inorganic material added to the porous coating layer functions to improve mechanical strength of the separator. The inorganic material is not particularly restricted as long as the inorganic material provides a uniform thickness to the porous coating layer and does not undergo oxidation and/or reduction within an operation voltage range of a secondary battery to which the present invention is applied. In particular, in the case in which inorganic particles having ion transfer ability are used, ionic conductivity of an electrochemical device may be improved, whereby performance of the battery may be improved. In addition, in the case in which inorganic particles having high permittivity are used as the inorganic particles, the degree of dissociation of electrolyte salt, e.g. lithium salt, in a liquid electrolyte may be increased, whereby ionic conductivity of the electrolytic solution may be improved.

Alumina ($Al_2O_3$) is mainly used as the inorganic material. However, in recent years, a metal hydroxide, or a hydroxide of a metal oxide is also used for the purpose of improving flame retardancy. The separator according to the present invention may be used by further incorporating a metal hydroxide, a hydroxide of a metal oxide, or a metal oxide into a coating layer.

The metal hydroxide, or the hydroxide of a metal oxide may be used together with a metal oxide.

The metal hydroxide or the hydroxide of the metal oxide may be aluminum hydroxide ($Al(OH)_3$), magnesium hydroxide ($Mg(OH)_2$), aluminum oxyhydroxide ($AlO(OH)$), $CaO.Al_2O_3.6H_2O$, calcium hydroxide, chromium hydroxide, nickel hydroxide, or boron hydroxide, or a combination of two or more thereof.

It is preferable that a thermal decomposition temperature of the metal hydroxide or the hydroxide of the metal oxide be different from a gas generation temperature of the gas generating agent according to the present invention. The gas-generating agent according to the present invention is preferentially pyrolyzed to generate gases, or in addition to this, the gas generating agent generates gases and a small amount of water to generate the flame retardation effect according to the present invention. Subsequently, when the temperature is continuously increased, it is preferable that the pyrolysis by the metal hydroxide or the hydroxide of the metal oxide be performed.

The type of the metal oxide is not particularly limited. For example, the metal oxide may be at least one selected from the group consisting of a metal oxide having a dielectric constant of 5 or more, a metal oxide having piezoelectricity, and a metal oxide having lithium ion transfer ability.

The metal oxide having a dielectric constant of 5 or more may be $SrTiO_3$, $SnO_2$, $CeO_2$, MgO, NiO, CaO, ZnO, $ZrO_2$, $Y_2O_3$, $Al_2O_3$ or $TiO_2$.

In the metal oxide having piezoelectricity, one side of the particles is positively charged and the other side thereof is negatively charged to cause a potential difference between both sides, when a predetermined pressure is applied. The metal oxide having piezoelectricity may be at least one selected from the group consisting of $BaTiO_3$, $Pb(ZrTi)O_3$ (PZT), $Pb_{1-x}La_xZr_{1-y}Ti_yO_3$ (PLZT, where $0<x<1$ and $0<y<1$), $Pb(Mg_{1/3}Nb_{2/3})O_3$—$PbTiO_3$ (PMN-PT), hafnia ($HfO_2$), and a combination thereof.

The metal oxide having lithium ion transfer ability contains lithium elements, but does not store lithium elements and transfer lithium ions. The metal oxide having lithium ion transfer ability may be at least one selected from the group consisting of lithium phosphate ($Li_3PO_4$) lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_x$O$_y$-based glasses ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, and a combination thereof.

Additionally, in addition to the metal oxide, the metal oxide having lithium ion transfer ability may further include at least one selected from the group consisting of lithium nitride ($Li_xN_y$, $0<x<4$, $0<y<2$) such as $Li_3N$, $SiS_2$-based glasses ($Li_xSi_yS_z$, $0<x<3$, $0<y<2$, $0<z<4$) such as $Li_3PO_4$—$Li_2S$—$SiS_2$, $P_2S_5$-based glasses ($Li_xP_yS_z$, $0<x<3$, $0<y<3$, $0<z<7$) such as $LiI$—$Li_2S$—$P_2S_5$, and a combination thereof.

The porous coating layer may have a porous network structure by connecting the inorganic particles through a binder resin. The porosity of the porous coating layer may be in the range of 10% to 90%, preferably 30% to 70%.

Although the particle size of the inorganic material is not particularly restricted, $D_{50}$ may have a range of 20 nm to 10 µm, specifically 100 nm to 2 µm, in consideration of the object of forming a coating layer having a uniform thickness and appropriate porosity.

In a particle size distribution curve of particles, $D_{50}$ means the particle size of particles equivalent to 50% of the accumulated number of particles, and the average particle size of the inorganic particles was measured using a Particle Size Analyzer (Product Name: MASTERSIZER 3000; Manufacturer: Malvern).

The amount of the inorganic material may be 50 parts by weight to 95 parts by weight based on the total weight of the solid content of the coating layer, and specifically, it may be 60 parts by weight to 95 parts by weight based on the total weight of the solid content of the coating layer. When the amount of the inorganic material is less than 50 parts by weight based on the total weight of the solid content of the coating layer, empty spaces formed between the inorganic particles are reduced since an amount of a binder becomes too large, thereby reducing pore size and porosity and resulting in deteriorating battery performance, which is undesirable. When the amount of the inorganic material is greater than 95 parts by weight based on the total weight of the solid content of the coating layer, the force of adhesion between the inorganic materials may be reduced since an amount of a binder is too small, thereby deteriorating mechanical properties of the separator itself, which is undesirable.

Dispersant

The porous coating layer may further include a dispersant in order to further improve dispersibility of the inorganic material. The dispersant functions to maintain a uniform dispersion state of a metal hydroxide, or a hydroxide of a metal oxide in the binder when preparing the coating layer slurry. For example, the dispersant may be at least one selected from an oil-soluble polyamine, an oil-soluble amine compound, a fatty acid, a fatty alcohol, and a sorbitan fatty acid ester. Specifically, the dispersant may be a high molecular weight polyamine amide carboxylic acid salt. The amount of the dispersant may be 0.2 parts by weight to 10 parts by weight based on 100 parts by weight of the inorganic material. When the dispersant is included in an amount of less than 0.2 parts by weight based on 100 parts by weight of the inorganic material, there is a problem in that the inorganic material is easily sunk. On the contrary, when the dispersant is included in amount exceeding 10 parts by weight, there are problems in that adhesion force of the coating layer to the separator substrate is reduced, or impurities are generated by reacting with an electrolyte when manufacturing a secondary battery.

Binder

The porous coating layer may further include a binder. The binder serves to stably fix the inorganic material to the surface of the porous substrate. For example, the binder may be any one selected from the group consisting of polyvinylidene fluoride-hexafluoropropylene, polyvinylidene fluoride-trichloroethylene, polymethylmethacrylate, polybutylacrylate, polyacrylonitrile, polyvinylpyrrolidone, polyvinylacetate, polyethylene-co-vinylacetate, polyethyleneoxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxymethylcellulose, and tannic acid, or a mixture of two or more thereof.

Gas Generating Agent

The gas generating agent may generate gases by reaction. The reaction can be based on temperature. The temperature range may be set within the range desired by the user, but a range of 60° C. to 250° C. is suitable. The gas generated by the gas generating agent is discharged through the pores of the porous coating layer. Therefore, the gas generating agent does not form separate pores in the porous coating layer when the gas is generated.

In the porous coating layer, the gas generating agent may be more distributed from a facing portion of the porous substrate and the porous coating layer to a non-facing portion of the porous substrate and the porous coating layer.

In addition, the gas generating agent may be disposed to be located near the pores. Since the gas generating agent is located near the pores, the gas may be discharged to the outside through the pores. In addition, since the coating layer may have a lattice structure, a net structure, or a porous structure with many pores, the coating layer may have a high electrolyte impregnation property and a form in which a passage through which the gas generated from the gas generating agent can pass is formed.

The gas generated by the gas generating agent may be an incombustible gas. Examples of the incombustible gas may include an inert gas, a fire extinguishing gas, and the like. The group consisting of $N_2$, He, Ne, Ar, Kr, and Xe may be considered for the inert gas, and the group consisting of $CO_2$, $F_2$, $Cl_2$, and $Br_2$ may be considered for the fire extinguishing gas. However, since halogen gas is a toxic substance, it is desirable not to use it except for facilities that require emergency.

The gas generating agent may be a material that is pyrolyzed at a predetermined temperature range to generate gases. In addition, the gas generating agent may be an organic foaming agent and/or an inorganic foaming agent. Non-limiting examples of the organic foaming agent include those selected from the group consisting of azo-based compounds, organic peroxides, hydrazide-based compounds, carbazide-based compounds, and peroxide-based compounds. Non-limiting examples of the inorganic foaming may include those selected from the group consisting of carbonate bases.

Non-limiting examples of the azo-based compounds include 2-2'-Azobis(isobutyronitrile), 2-2'-Azobis(2-methylbutyronitrile), 2-2'-azobis(2-methylvaleronitrile), 2-2'-azobis(2,3-dimethylbutyronitrile), 2,2'-azobis(2-methylcapronitrile), 2,2'-azobis(2,4-dimethylvaleronitrile), 1,1'-Azobis(1-cyclohexylcyanide), 2,2'-dimethoxy-2,2'-azopropane, 2,2'-diethoxy-2,2'-azopropane, 2,2'-dipropoxy-2,2'-azopropane, 2,2'-diisopropoxy-2,2'-azopropane, 2,2'-dibutoxy-2,2'-azopropane, 2,2'-diisobutoxy-2,2'-azopropane, 2,2'-dineobutoxy-2,2'-azopropane, azodicarbonamide, or a mixture thereof.

Non-limiting examples of the organic peroxides include bis(3-methyl-3-methoxybutyl)peroxy dicarbonate, t-butyl peroxyneodecanoate, t-butyl peroxy pivalate, dilauroyl peroxide, distearyl peroxide, t-butyl peroxy-2-ethylhexanoate, benzoyl peroxide, t-butyl peroxylaurate, t-butylperoxy 2-ethylhexylcarbonate, t-butylperoxybenzoate, t-hexyl peroxybenzoate, dicumyl peroxide, t-butyl cumylperoxide, di-t-butyl peroxide, 2,5-dimethyl-2,5-bis(t-butyl peroxy)hexane, or a mixture thereof.

Non-limiting examples of the hydrazide-based compounds include benzosulfonylhydrazide, 4,4'-oxybis (benzenesulfonylhydrazide), P,P'-oxybis (benzenesulfonylhydrazide), P-toluenesulfonylhydrazide, polybenzenesulfonylhydrazide, bis(hydrazosulfonyl)benzene, 4,4'-bis(hydrazosulfonyl)biphenyl, diphenyldisulfonylhydrazide, diphenylsulfone-3,3-disulfonylhydrazide, or a mixture thereof.

Non-limiting examples of the carbazide-based compounds include terephthalzide, other fatty acid azide and aromatic acid azide, or a mixture thereof.

Non-limiting examples of the carbonate-based compounds may include graphite, calcium carbonate ($CaCO_3$), sodium hydrogen carbonate ($NaHCO_3$), sodium silicate, or a mixture thereof.

Thereamong, the most preferred materials are azodicarbonamide, N,N-dinitrosopentamethylene tetramine, P,P'-oxybis(benzenesulfonylhydrazide), TSH forming agent, P-toluenesulfonyl semicarbazide, 5-phenyltetrazole, and sodium hydrogen carbonate.

Since the above-mentioned compounds have different gas generation temperatures, this may control the gas generation temperature.

In the present invention, the gas generating agent may replace some or all of the inorganic material. That is, the gas generating agent may be included instead of the inorganic material included in the coating layer, and at this time, the composition ratio of the inorganic material may be reduced by the composition ratio including the gas generating agent.

Method of Manufacturing a Separator

A method of manufacturing a separator according to the present invention may include a) a step of providing a porous substrate; b) a step of forming a coating layer by applying a slurry obtained by adding a coating composition comprising a gas generating agent and a binder to a first solvent on at least one surface of the porous substrate; and c) a step of drying the coated separator of step b).

In addition, a step of immersing the coated separator of step b) or the dried separator of step c) may be added between step b) and step c)

The coating layer may include inorganic particles.

The porous substrate, the inorganic particles, the gas generating agent, and the binder are as described above.

In the step of forming a coating layer on at least one surface of the porous substrate, a method of immersing the porous substrate in a slurry obtained by adding a coating composition including the gas generating agent and the binder to the first solvent, or applying the slurry on the porous substrate may be used. A general method well known in the art to which the present invention pertains may be used as the application or coating method. For example, any of various methods, such as a dip coating method, a die coating method, a roll coating method, a comma coating method, or a combination thereof, may be used.

In the drying step, an oven or a heating type chamber may be used within a temperature range considering vapor pressure of a solvent, and a method of leaving the porous substrate at room temperature may also be used in order to volatilize the solvent. At this time, a temperature ranging from 25° C. to 100° C. and a relative humidity of 40% or more may be considered.

As for the first solvent and the second solvent for manufacturing the separator according to the present invention, conventional solvents known in the art may be used without limitation. Preferably, acetone, tetrahydrofuran, acetonitrile, dimethyl formamide, dimethyl sulfoxide, dimethyl acetamide, N-methylpyrrole, or water may be used, and a combination of two or more thereof may be used. In the case of the second solvent, it is possible to use any solvent not used as the first solvent without limitation.

When the first solvent used in the slurry and the second solvent immersing the separator are different, only a pore-generating material can be dissolved, thereby capable of forming the pores of the separator coating layer better. As a result, the gas generated from the gas generating agent present in the separator coating layer can operate more efficiently.

Hereinafter, the present invention will be described with reference to the following examples. These examples are provided only for easier understanding of the present invention and should not be construed as limiting the scope of the present invention.

COMPARATIVE EXAMPLE 75 wt % of alumina ($Al_2O_3$), 23 wt % of a binder, and 2 wt % of a dispersant were dispersed in acetone to form a slurry, and the slurry was applied on opposite surfaces of a polyolefin substrate to manufacture a separator having a coating layer of 8 μm thickness, which was used as Comparative Example.

Example 1

In Example 1 of the present invention, a coating layer was formed by replacing 75 wt % of alumina ($Al_2O_3$) of Comparative Example with 52.5 wt % of alumina ($Al_2O_3$) and 22.5 wt % of azodicarbonamide (ADCA).

Example 2

In Example 2 of the present invention, a coating layer was formed by replacing 75 wt % of alumina ($Al_2O_3$) of Comparative Example with 75 wt % of azodicarbonamide (ADCA).

Example 3

In Example 3 of the present invention, a coating layer was formed by replacing 75 wt % of alumina ($Al_2O_3$) of Comparative Example with 52.5 wt % of alumina ($Al_2O_3$) and 22.5 wt % of p-toluenesulfonyl semicarbazide (PTSS).

Example 4

In Example 4 of the present invention, a coating layer was formed by replacing 75 wt % of alumina ($Al_2O_3$) of Comparative Example with 75 wt % of p-toluenesulfonyl semicarbazide (PTSS).

Example 5

In Example 5 of the present invention, a coating layer was formed by replacing 75 wt % of alumina ($Al_2O_3$) of Comparative Example with 52.5 wt % of alumina ($Al_2O_3$) and 22.5 wt % of sodium hydrogen carbonate ($NaHCO_3$).

Example 6

In Example 6 of the present invention, a coating layer was formed by replacing 75 wt % of alumina ($Al_2O_3$) of Comparative Example with 75 wt % of sodium hydrogen carbonate ($NaHCO_3$).

Experimental Example 1: Flame Retardancy Evaluation Experiment

The separators of Comparative Example and Examples 1 to 6 were cut to a size of 120 mm in length and 20 mm in width, and four sheets of each separator were laminated at 100° C., as shown in the Figure.

Upper 5 mm of the width axis of each of the laminated separators was fixed to a frame using polyimide tape, and the 20 mm point of the length axis of each sample was measured and marked, as shown in the Figure.

3. An alcohol lamp was placed under the 20 mm section of the length axis of each sample marked as described above such that flames reached the sample.

4. Combustion time and length were measured from the 20 mm section of the length axis of each sample marked as described above as a start point, and combustion speed was calculated therefrom.

Table 1 below shows the results thereof.

TABLE 1

| | Combustion length (mm) | Combustion time (s) | Combustion speed (mm/s) |
| --- | --- | --- | --- |
| Comparative Example | 100 | 13 | 7.8 |
| Example 1 | 100 | 35 | 2.9 |
| Example 2 | 100 | 83 | 1.2 |
| Example 3 | 100 | 27 | 3.7 |
| Example 4 | 100 | 44 | 2.3 |
| Example 5 | 100 | 24 | 4.7 |
| Example 6 | 100 | 32 | 3.1 |

It can be seen from Table 1 above that Examples of the present invention, having the gas generating agents added, have a short combustion length per time, and therefore the flame retardation effect is excellent. In particular, it can be seen that Examples 2, 4 and 6, having 100% of the gas generating agent added, have the shortest combustion speed. Examples 1 to 4 are organic foaming agents, and Examples 5 and 6 are inorganic foaming agents.

Experimental Example 2: Gas Generation Experiment 1. 6 separators of Comparative Example, Example 3, and Example 5 with a size of 4 cm×5 cm, respectively, and 0.2 g of electrolyte solution were put into the prepared pouches with a size of 5 cm×5 cm to manufacture pouches of Comparative Example, Example 3, and Example 5, and then sealed.

2. The separators were immersed in the electrolyte solution for 30 minutes and then placed in a convection oven set at 150° C. for 30 minutes.

When checking and looking at the pouches placed in the oven for 30 minutes as described above, the pouch containing the separator of Comparative Example did not have a vent, but it can be seen that the separators of Examples 3 and 5 having a coating layer including a gas generating agent had a vent. As a result, it can be seen that the separator according to the present invention causes a vent in the pouch when an abnormal temperature is reached due to an abnormality in the battery. Therefore, when the battery is in an abnormal situation, the safety of the battery can be further secured by stopping the function of the battery before explosion or ignition of the battery occurs.

Experimental Example 3: Thermal Shrinkage Experiment

The separators of Comparative Example, Example 1, Example 3 and Example 5 were cut to a size of 5 cm in length (MD) and 5 cm in width (TD) and were stored in a chamber at 150° C. for 30 minutes. The degree of shrinkage of each of the separators in the length direction and in the width direction was measured.

The separator of Comparative Example shrank 10% in length and 8% in width. In the case of Example 1, the separator shrank 10% in length and 8% in width. In the case of Example 3, the separator shrank 11% in length and 10% in width. In the case of Example 5, the separator shrank 12% in length and 8% in width. As the shrinkage of the separators of Comparative Example, Example 1, Example 3 and Example 5 was similar, it was found that, even in the case in which the gas generating agent was included in the coating layer, the thermal shrinkage characteristics of the conventional separator were maintained.

Those skilled in the art to which the present invention pertains will appreciate that various applications and modifications are possible within the category of the present invention based on the above description.

INDUSTRIAL APPLICABILITY

As is apparent from the above description, a separator according to the present invention includes a gas generating agent. When a certain temperature is reached, the gas generating agent generates a large amount of gas to exhibit the flame retardation effect. The generation of a large amount of gas may cause a short circuit of the battery and the expansion and rupture of the battery case, whereby it is possible to forcibly stop the function of the battery.

Therefore, when the battery is in an abnormal situation, the safety of the battery can be further secured by stopping the function of the battery before explosion or ignition of the battery occurs.

Unlike conventional hydrate or hydroxide flame retardants, there is little concern about additional reaction since a small amount of water is generated.

In addition, since a large amount of gas is generated compared to a conventional flame retardant, explosion or combustion at a high temperature can be more accurately prevented, whereby it is possible to further improve the safety of the battery. Since the present invention uses an amount of the gas generating agent capable of causing a short circuit of the battery only by generating a large amount of gas, the volume occupied by the flame retardant is small. As a result, an effect of indirectly increasing the capacity of the battery can also be obtained.

The invention claimed is:

1. A separator comprising: a porous substrate; and a porous coating layer comprising an inorganic material and a gas generating agent on at least one surface of the porous substrate, wherein the gas generating agent comprises an organic foaming agent, and wherein the organic foaming agent comprises at least one selected from the group consisting of organic peroxides, carbazide-containing compounds, and peroxide-containing compounds, and wherein the inorganic material comprises at least one selected from aluminum hydroxide (Al (OH) 3), magnesium hydroxide (Mg (OH) 2), aluminum oxyhydroxide (AlO (OH)), CaO·Al$_2$O$_3$·6H$_2$O, calcium hydroxide, chromium hydroxide, nickel hydroxide, boron hydroxide, a metal oxide having a dielectric constant of 5 or more, a metal oxide having piezoelectricity, and a metal oxide having lithium ion transfer ability, and wherein the porous coating layer has a porous network structure by connecting the inorganic particles through a binder resin.

2. The separator according to claim 1, wherein the gas generating agent generates gas by reaction.

3. The separator according to claim 2, wherein the gas generating agent does not form pores in the porous coating layer when the gas generating agent generates the gas.

4. The separator according to claim 2, wherein the gas is an incombustible gas.

5. The separator according to claim 1, wherein the gas generating agent further comprises an inorganic foaming agent.

6. The separator according to claim 5, wherein the inorganic foaming agent comprises at least one carbonate-containing compound.

7. An electric device comprising the separator according to claim 1.

8. A method of manufacturing a separator, comprising: a) providing a porous substrate; b) forming a coating layer on at least one surface of the porous substrate by applying a slurry obtained by mixing a coating composition comprising an inorganic material and a gas generating agent and a binder with a first solvent to obtain a coated separator; and c) drying the coated separator of step b) to obtain a dried separator, wherein the gas generating agent comprises an organic foaming agent, and wherein the organic foaming agent comprises at least one selected from the group consisting of azo-containing compounds, organic peroxides, hydrazide-containing compounds, carbazide-containing compounds, and peroxide-containing compounds, and wherein the inorganic material comprises at least one selected from aluminum hydroxide (Al (OH) 3), magnesium hydroxide (Mg(OH)2), aluminum oxyhydroxide (AlO (OH)), CaO·Al$_2$O$_3$·6H$_2$O, calcium hydroxide, chromium hydroxide, nickel hydroxide, boron hydroxide, a metal oxide having a dielectric constant of 5 or more, a metal oxide having piezoelectricity, and a metal oxide having lithium ion transfer ability, and wherein the coating layer has a porous network structure by connecting the inorganic particles through the binder.

9. The method according to claim 8, further comprising immersing the coated separator of step b) in a second solvent between step b) and step c).

10. The method according to claim 8, wherein the gas generating agent further comprises an inorganic foaming agent.

11. The method according to claim 10, wherein the inorganic foaming agent comprises at least one carbonate-containing compound.

12. The method according to claim 8, further comprising immersing the dried separator of step c) in a second solvent.

13. The separator according to claim 1, wherein the gas generating agent further comprises an organic peroxide selected from bis(3-methyl-3-methoxybutyl) peroxy dicarbonate, t-butyl peroxyneodecanoate, t-butyl peroxy pivalate, dilauroyl peroxide, distearyl peroxide, t-butyl peroxy-2-ethylhexanoate, benzoyl peroxide, t-butyl peroxylaurate, t-butylperoxy 2-ethylhexylcarbonate, t-butylperoxybenzoate, t-hexyl peroxybenzoate, dicumyl peroxide, t-butyl cumylperoxide, di-t-butyl peroxide, 2,5-dimethyl-2,5-bis (t-butyl peroxy) hexane, or a mixture thereof.

14. The separator according to claim 1, wherein the gas generating agent further comprises a carbazide-containing compound selected from terephthalzide, other fatty acid azide and aromatic acid azide, or a mixture thereof.

15. The separator according to claim 1, wherein the gas generating agent comprises p-toluenesulfonyl semicarbazide toluenesulfonyl semicarbazide (PISS).

16. A separator comprising: a porous substrate; and a porous coating layer comprising an inorganic material and a gas generating agent on at least one surface of the porous substrate, wherein the gas generating agent comprises an organic foaming agent, and wherein the organic foaming agent comprises at least one selected from the group consisting of organic peroxides, carbazide-containing compounds, and peroxide-containing compounds, and wherein the inorganic material comprises at least one selected from aluminum hydroxide (Al(OH)3), magnesium hydroxide (Mg(OH)2), aluminum oxyhydroxide (AlO(OH)), CaO·Al$_2$O$_3$·6H$_2$O, calcium hydroxide, chromium hydroxide, nickel hydroxide, boron hydroxide, a metal oxide having a dielectric constant of 5 or more, a metal oxide having piezoelectricity, and a metal oxide having lithium ion transfer ability, wherein the porous coating layer has a porosity of 10% to 90%, preferably 30% to 70%, and wherein the inorganic particles in the porous coating layer are in an amount of 50 parts by weight to 95 parts by weight based on the total weight of the solid content of the porous coating layer.

17. A method of manufacturing a separator, comprising: a) providing a porous substrate; b) forming a coating layer on at least one surface of the porous substrate by applying a slurry obtained by mixing a coating composition comprising an inorganic material and a gas generating agent and a binder with a first solvent to obtain a coated separator; and c) drying the coated separator of step b) to obtain a dried separator, wherein the gas generating agent comprises an organic foaming agent, and wherein the organic foaming agent comprises at least one selected from the group consisting of azo-containing compounds, organic peroxides, hydrazide-containing compounds, carbazide-containing compounds, and peroxide-containing compounds, and wherein the inorganic material comprises at least one selected from aluminum hydroxide (Al(OH)3), magnesium hydroxide (Mg(OH)2), aluminum oxyhydroxide (AlO(OH)), $CaO \cdot Al_2O_3 \cdot 6H_2O$, calcium hydroxide, chromium hydroxide, nickel hydroxide, boron hydroxide, a metal oxide having a dielectric constant of 5 or more, a metal oxide having piezoelectricity, and a metal oxide having lithium ion transfer ability, wherein the coating layer has a porosity of 10% to 90%, preferably 30% to 70%, and wherein the inorganic particles in the coating layer are in an amount of 50 parts by weight to 95 parts by weight based on the total weight of the solid content of the coating layer.

\* \* \* \* \*